US 9,758,075 B2

(12) United States Patent
Andersson et al.

(10) Patent No.: US 9,758,075 B2
(45) Date of Patent: Sep. 12, 2017

(54) SEAT ASSEMBLY HAVING AN ARMREST

(75) Inventors: Christer Andersson, Trollhattan (SE); Odd Jaegtnes, Nygard (SE)

(73) Assignee: Lear Corporation, Southfield, MI (US)

( * ) Notice: Subject to any disclaimer, the term of this patent is extended or adjusted under 35 U.S.C. 154(b) by 2085 days.

(21) Appl. No.: 12/719,074

(22) Filed: Mar. 8, 2010

(65) Prior Publication Data

US 2010/0244502 A1 Sep. 30, 2010

Related U.S. Application Data

(60) Provisional application No. 61/164,090, filed on Mar. 27, 2009.

(51) Int. Cl.
*B60N 2/46* (2006.01)
*B60N 2/48* (2006.01)
*B60N 3/10* (2006.01)

(52) U.S. Cl.
CPC .......... *B60N 2/468* (2013.01); *B60N 2/4613* (2013.01); *B60N 2/4858* (2013.01); *B60N 3/102* (2013.01); *B60N 2002/4891* (2013.01)

(58) Field of Classification Search
USPC .......... 297/61, 112, 113, 115, 117, 238, 403, 297/410
See application file for complete search history.

(56) References Cited

U.S. PATENT DOCUMENTS

| 5,366,270 | A | * | 11/1994 | Heussner et al. | |
| 5,433,503 | A | * | 7/1995 | De Filippo | |
| 5,700,054 | A | * | 12/1997 | Lang | 297/238 |
| 5,826,942 | A | * | 10/1998 | Sutton et al. | |
| 7,735,913 | B2 | * | 6/2010 | Crombez et al. | |
| 2007/0069561 | A1 | * | 3/2007 | Schnabel et al. | |

FOREIGN PATENT DOCUMENTS

| DE | 4015872 C1 | 1/1992 |
| DE | 19859204 A1 | 6/2000 |
| JP | 9002123 A | 1/1997 |
| JP | 11020528 A | 1/1999 |
| JP | 2006141855 A | 6/2006 |
| JP | 2008184035 A | 8/2008 |
| KR | 20050115524 A | 12/2005 |

* cited by examiner

*Primary Examiner* — Anthony D Barfield
(74) *Attorney, Agent, or Firm* — Brooks Kushman P.C.

(57) ABSTRACT

A seat assembly having a seat back and an armrest. The armrest is disposed on the seat back and is configured to pivot about an axis of rotation. The armrest has a headrest that is moveable between an extended position and a retracted position. The armrest is inhibited from pivoting about the axis of rotation when the headrest is in the extended position.

18 Claims, 9 Drawing Sheets

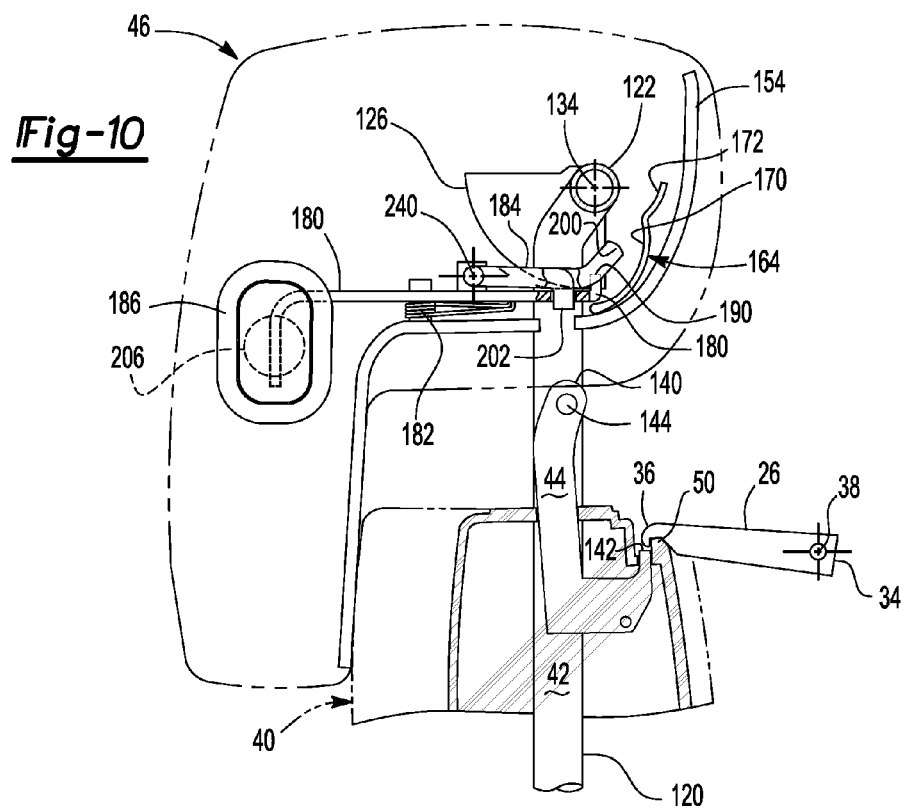
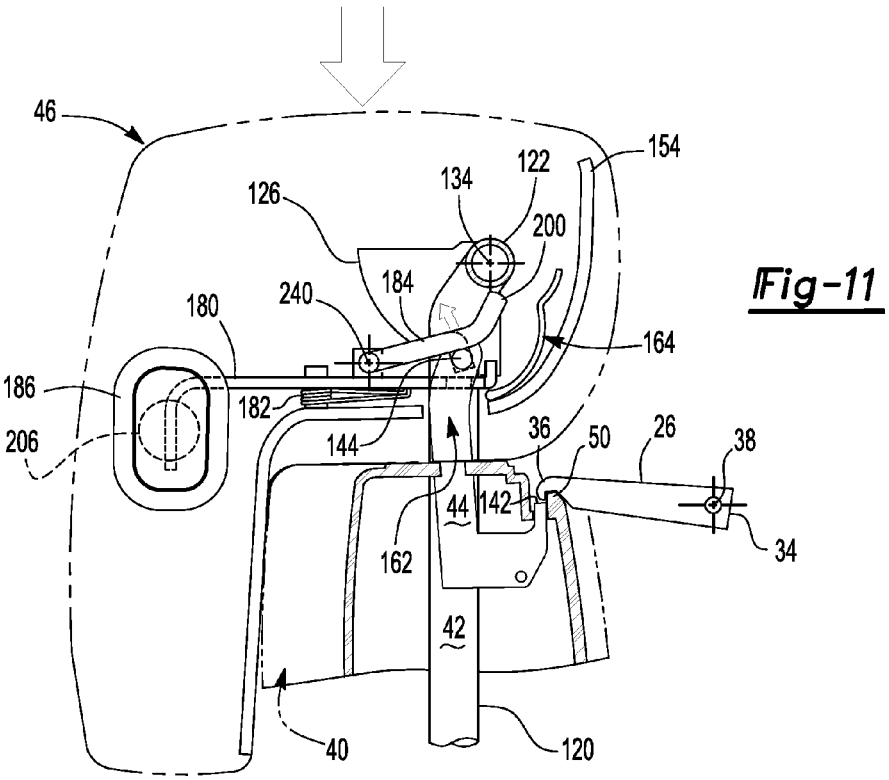

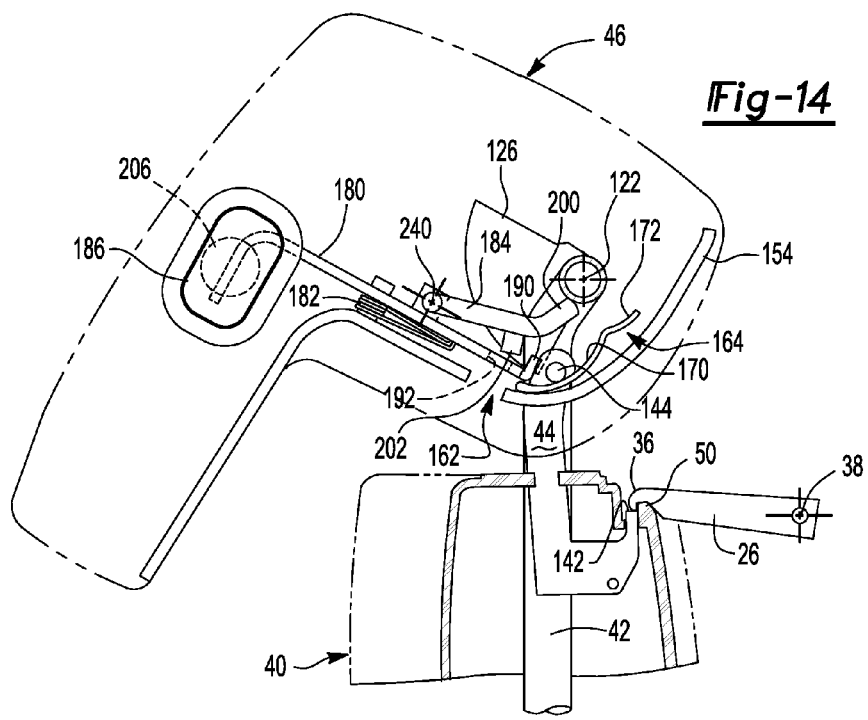
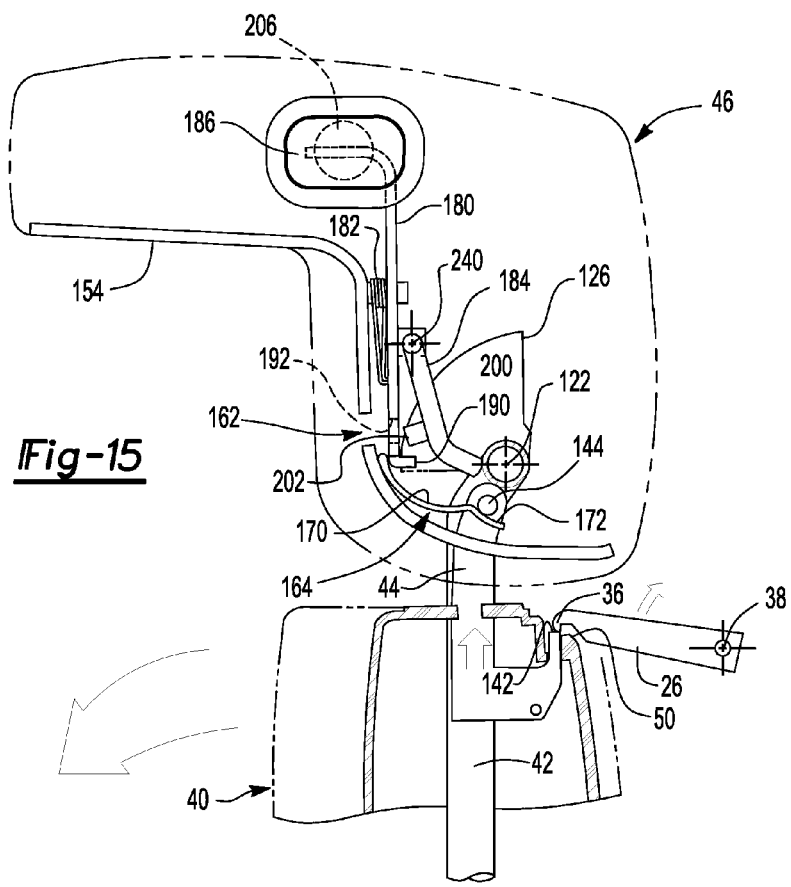

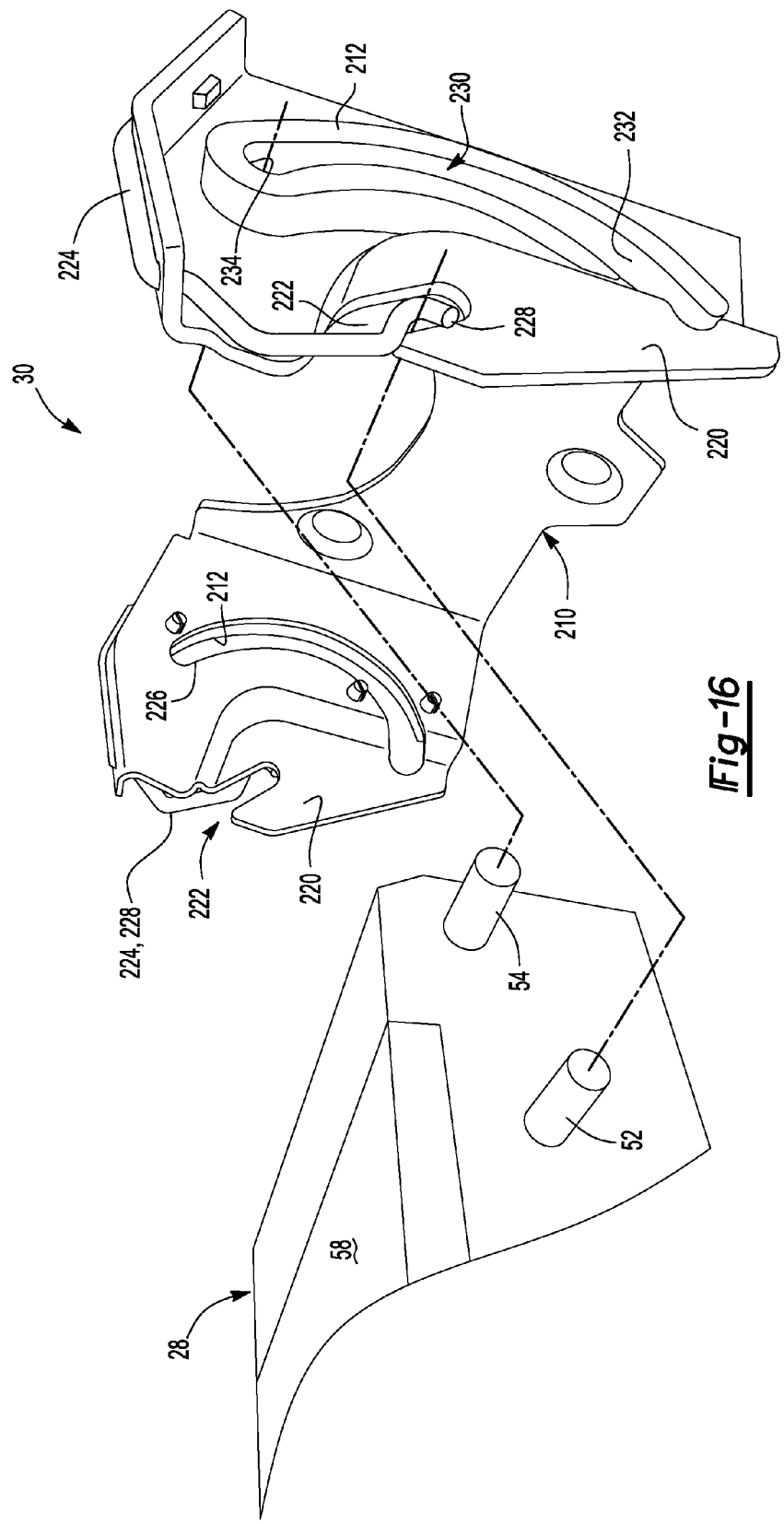

SEAT ASSEMBLY HAVING AN ARMREST

CROSS-REFERENCE TO RELATED APPLICATIONS

This application claims the benefit of U.S. provisional application Ser. No. 61/164,090 filed Mar. 27, 2009.

BACKGROUND OF THE INVENTION

1. Field of the Invention

The present invention relates to a seat assembly having an armrest.

SUMMARY OF THE INVENTION

In at least one embodiment, a seat assembly is provided. The seat assembly includes a seat back and an armrest. The armrest is disposed on the seat back and is configured to pivot about an axis of rotation. The armrest has a headrest that is moveable between an extended position and a retracted position. The armrest is inhibited from pivoting about the axis of rotation when the headrest is in the extended position.

In at least one embodiment, a seat assembly is provided. The seat assembly includes a seat back and an armrest. The armrest is configured to pivot with respect to the seat back about a first axis of rotation. The armrest has a headrest that is configured to pivot about a second axis of rotation between a first rotational position in which the headrest engages the seat back and a second rotational position in which the headrest is spaced apart from the seat back. The armrest is permitted to pivot about the first axis of rotation when the headrest is second rotational position.

In at least one embodiment, a seat assembly is provided. The seat assembly includes a seat back and an armrest. The armrest is disposed on the seat back and is configured to pivot about a first axis of rotation between a folded position and an unfolded position. The armrest has a top surface, a front surface, and a headrest. The headrest is moveable between an extended position in which the headrest is spaced apart from the top surface and a retracted position in which the headrest engages the top surface. The armrest is permitted to pivot about the first axis of rotation between the folded and unfolded positions when the headrest is in the retracted position and the headrest is rotated about a second axis of rotation from a first rotational position in which the headrest engages the front surface to a second rotational position in which the headrest is spaced apart from the front surface.

BRIEF DESCRIPTION OF THE DRAWINGS

FIG. 10 is a fragmentary side view of the seat assembly showing the armrest in the folded position and the headrest in the extended position.

FIG. 11 is a fragmentary side view of the seat assembly showing the armrest in the folded position and the headrest in a retracted position.

FIGS. 14 and 15 are fragmentary side views of the seat assembly illustrating rotation of the headrest.

FIG. 16 is a fragmentary perspective view of the armrest and a mounting bracket assembly.

DETAILED DESCRIPTION

Figure 1:
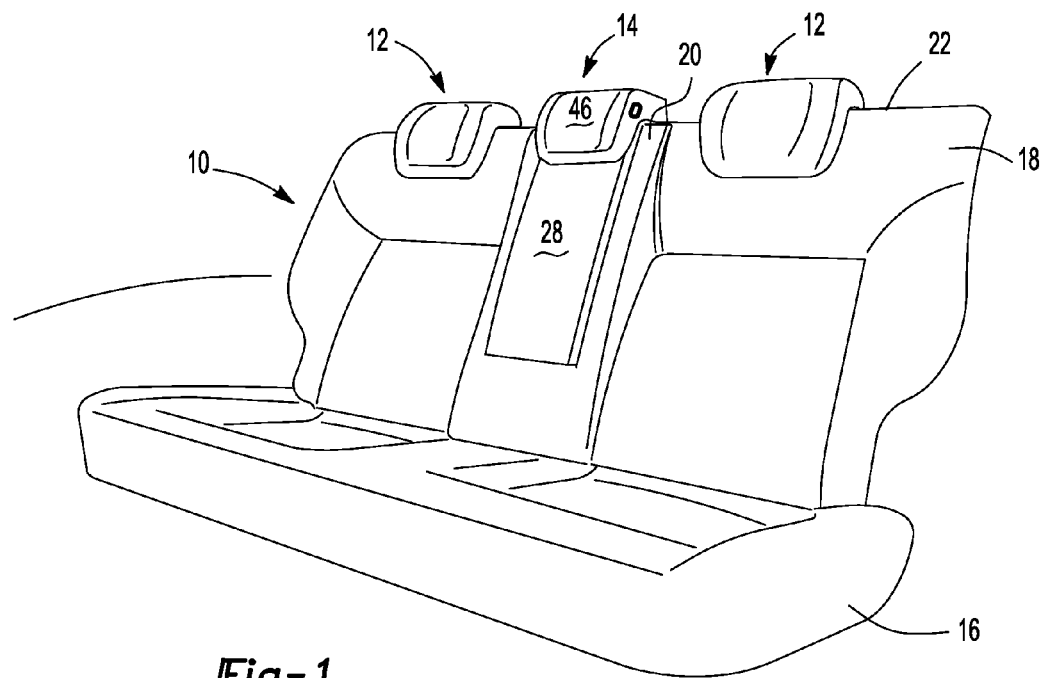
FIG. 1 is a perspective view of a seat assembly having an armrest that includes a headrest.
Figure 2:
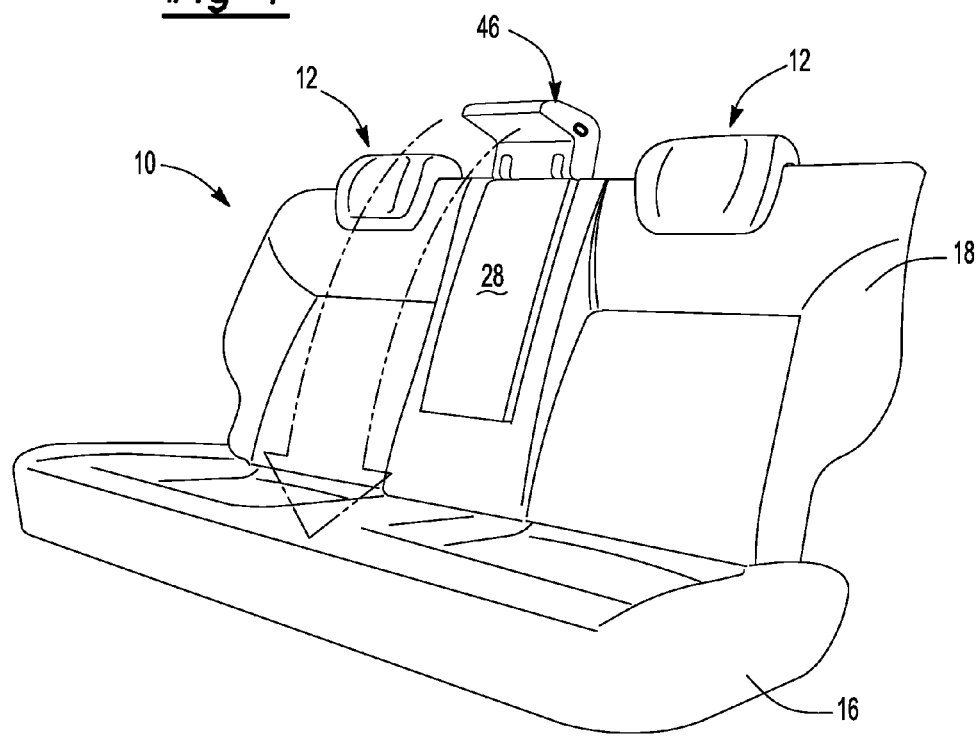
FIG. 2 is a perspective view of the seat assembly with the headrest rotated with respect to FIG. 1.

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Referring to FIGS. 1-5, an exemplary seat assembly 10 is shown. The seat assembly 10 may be configured for use in a vehicle, such as a motor vehicle like a car or truck.

The seat assembly 10 may provide multiple seating positions. For instance, the seat assembly 10 may have one or more primary seating positions 12 and a secondary seating position 14. The secondary seating position 14 may be disposed between two primary seating positions 12. In addition, the seat assembly 10 may include a seat bottom 16 and a seat back 18. In a vehicular application, the seat bottom 16 may be configured to be mounted on a support surface, such as a floor pan of a vehicle. The seat bottom 16 may be configured to support a seat occupant.

The seat back 18 may be disposed proximate the seat bottom 16 and may be configured to support the back of a seat occupant. The seat back 18 or a portion thereof may be configured to pivot with respect to the seat bottom 16. The seat back 18 may include a front surface 20, a top surface 22, a cavity 24, a latch 26, an armrest 28, and a mounting bracket assembly 30.

The front surface 20 may provide a portion of a seating surface for a seat occupant. For example, the front surface 20 may face toward and support the back of a seat occupant.

The top surface 22 may be disposed proximate or extend from the front surface 20. The top surface 22 may be located at the top of the seat back 18 and extend away from the front surface 20.

The cavity 24 may be configured to receive the armrest 28. The cavity 24 may extend away from the front surface 20 toward a back side of the seat back 18. In addition, the cavity 24 may extend from the top surface 22 toward the seat bottom 16. As such, top surface 22 may be open at the cavity 24. The cavity 24 may be disposed between the primary seating positions 12.

Figure 3:
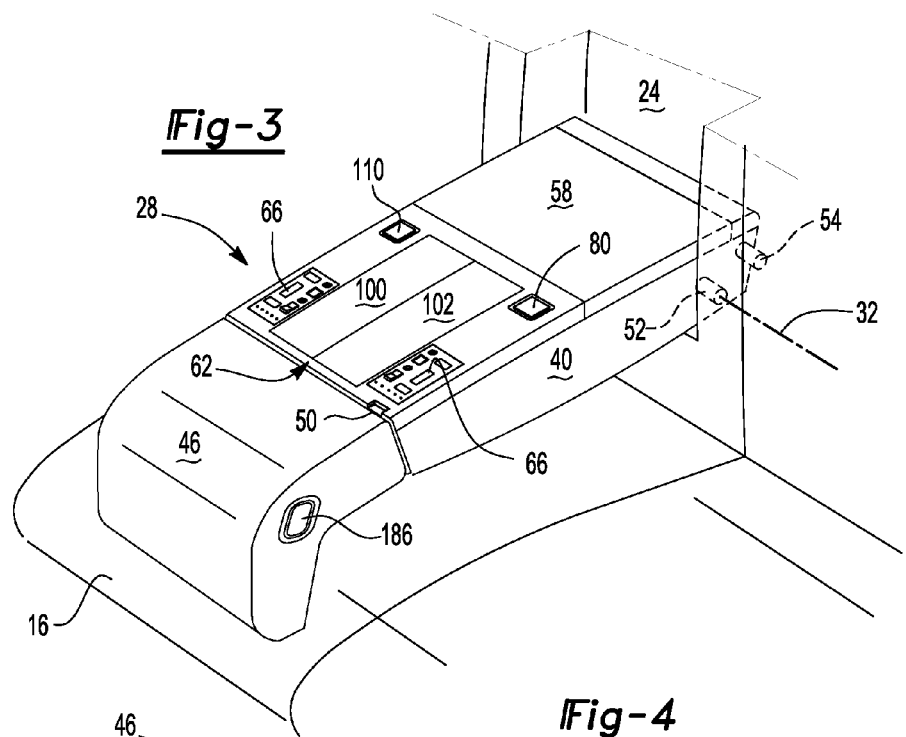
FIG. 3 is a perspective view of the seat assembly with the armrest in an unfolded position.
Figure 5:
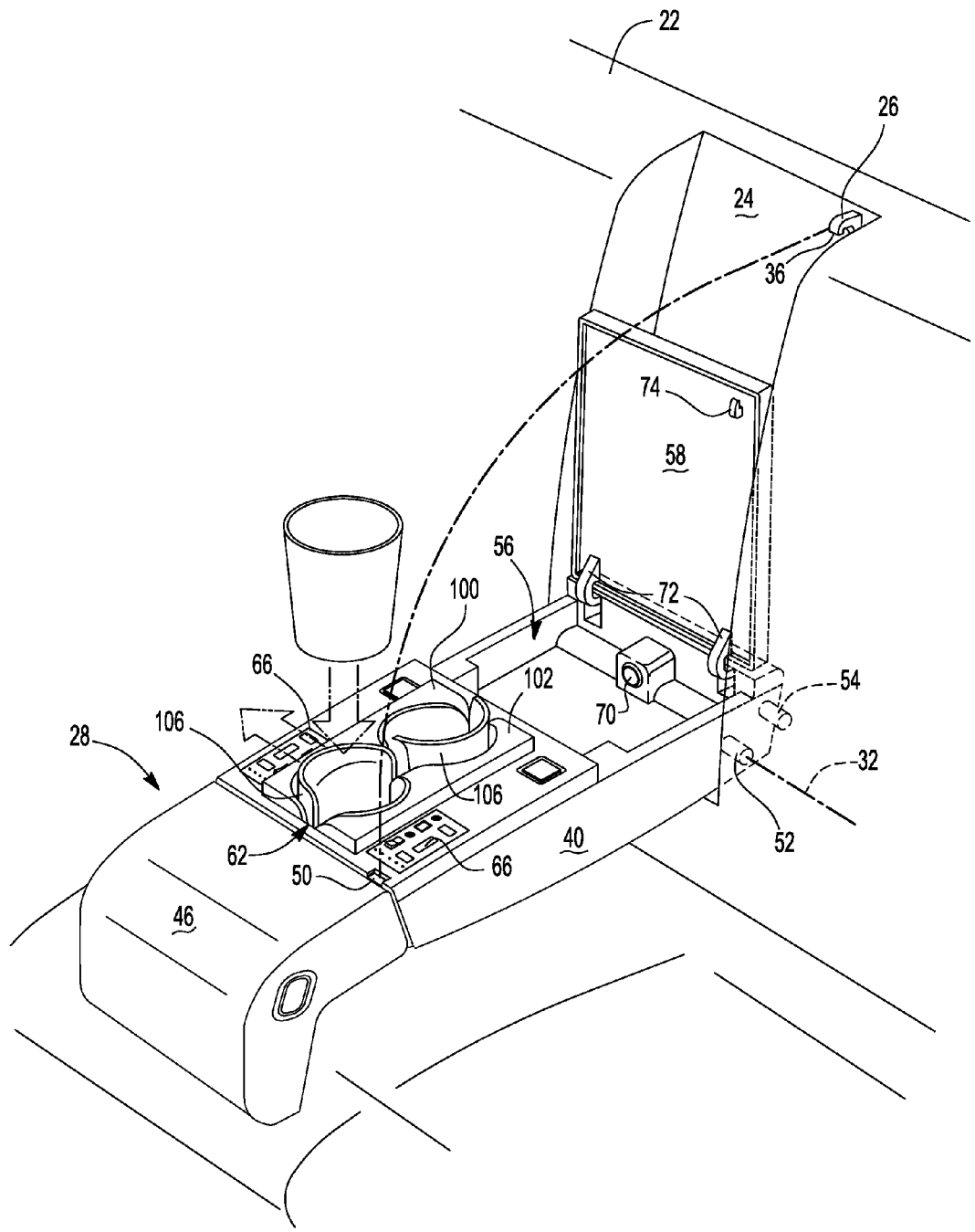
FIG. 5 is a perspective view of the armrest with a cupholder assembly and a storage compartment lid in open positions.

Referring to FIGS. 5 and 10, the latch 26 is shown in more detail. The latch 26 may be configured enable or disable pivotal movement of the armrest 28 about a first axis of rotation 32. More specifically, the latch 26 may engage the armrest 28 to hold the armrest 28 in a stowed or folded position as shown in FIG. 1, and may disengage the armrest 28 to permit the armrest 28 to move toward an unfolded position as shown in FIG. 3. The latch 26 may extend though an opening in the seat back 18 and include a first end 34 and a second end 36 disposed opposite the first end 34.

The first end 34 may be mounted to and disposed within the seat back 18. For instance, the first end 34 may be disposed on a structural frame of the seat back 18. The first end 34 may be configured to permit the latch 26 to rotate about a latch axis of rotation 38 between a latched position and an unlatched position. In the latched position, the latch 26 may engage the armrest 28 to inhibit pivotal movement of the armrest 28 about the first axis of rotation 32. In the unlatched position, the latch 26 may disengage the armrest 28 to permit pivotal movement of the armrest 28 about the first axis of rotation 32. A biasing member, such as a spring, may also be provided to bias the latch 26 toward the latched position.

The second end 36 may be disposed in the cavity 24. The second end 36 may be adapted to engage the armrest 28. For instance, the second end 36 may be configured as a hook that may engage and inhibit movement of the armrest 28. The second end 36 may have any suitable configuration, such as a male configuration, female configuration, or combinations thereof.

Figure 4:
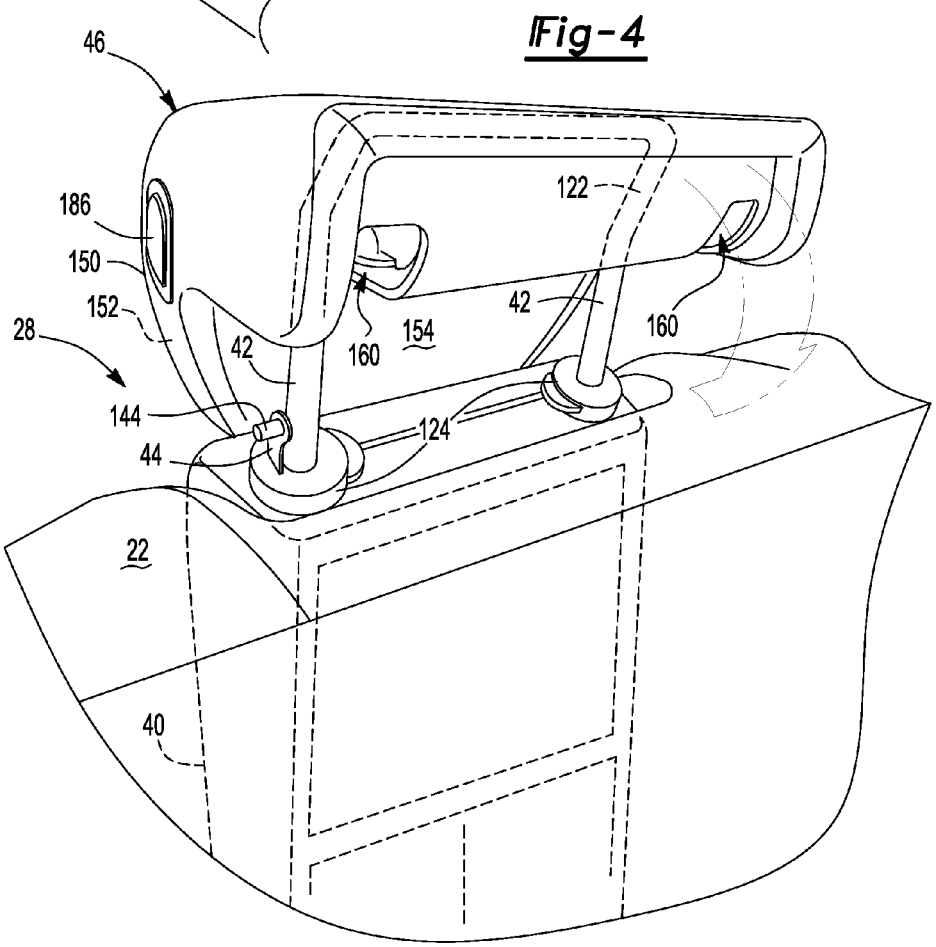
FIG. 4 is a perspective view of the seat assembly illustrating the headrest in an extended position.

Referring to FIGS. 3-5, an embodiment of the armrest 28 is shown in more detail. The armrest 28 may be configured to rotate between folded and unfolded positions as previously discussed. The armrest 28 may support the back of a seat occupant disposed in the secondary seating position 14 when in the folded position. In addition, the armrest 28 may support the arm of a seat occupant disposed in the primary seating position 12 when in the unfolded position. The armrest 28 may include a body 40, a support post 42, a release rod 44, and a headrest 46.

The body 40 may provide the main structure of the armrest 28. The body 40 may act as a housing and provide one or more exterior surfaces of the armrest 28. The body 40 may have a first end from which the support post 42 extends and a second end disposed opposite the first end. The body 40 may include or be mounted on a structural frame. The body 40 may include a locking feature 50, a pivot pin 52, a stop pin 54, a storage compartment 56, a storage compartment lid 58, a storage compartment latch mechanism 60, a cupholder 62, a cupholder release mechanism 64, and one or more control panels 66.

The locking feature 50 may be coupled to or engage the latch 26 to secure the armrest 28 in the folded position. The locking feature 50 may have any suitable configuration that is compatible with the latch 26. In the embodiment shown, the locking feature 50 is configured as an opening in an exterior surface of the body 40.

The pivot pin 52 and the stop pin 54 may be provided to couple the armrest 28 to the mounting bracket assembly 30. In at least one embodiment, two pivot pins 52 and two stop pins 54 may be provided that extend from opposite sides of the body 40. The pivot pins 52 may be coaxially disposed about the first axis of rotation 32. The stop pins 54 may be spaced apart from the pivot pins 52 and cooperate with the mounting bracket assembly 30 to limit rotation to the armrest 28 as will be described in more detail below.

The storage compartment 56 may be disposed within the body 40 and provide a storage space for various articles. In at least one embodiment, the storage compartment 56 may be disposed near the second end of the body 40 and opposite the headrest 46. A power point 70 may be disposed in the storage compartment 56 and provide a receptacle for providing electrical power to one or more electrical devices, such as a cellphone, audio/video player, or entertainment device.

The storage compartment lid 58 may be disposed on the body 40 and be configured to selectively cover the storage compartment 56. The storage compartment lid 58 may be coupled to the body 40 by one or more hinges 72 and may pivot between a closed position and an open position. In the closed position, the storage compartment lid 58 may cover the storage compartment 56 as shown in FIG. 3 and may provide a surface to support the arm of a seat occupant. In the open position, the storage compartment lid 58 may be spaced apart from the storage compartment 56 as shown in FIG. 5 to provide access to the storage compartment 56. The storage compartment lid 58 may include a lid latch 74 that extends toward the storage compartment 56.

Figure 6:
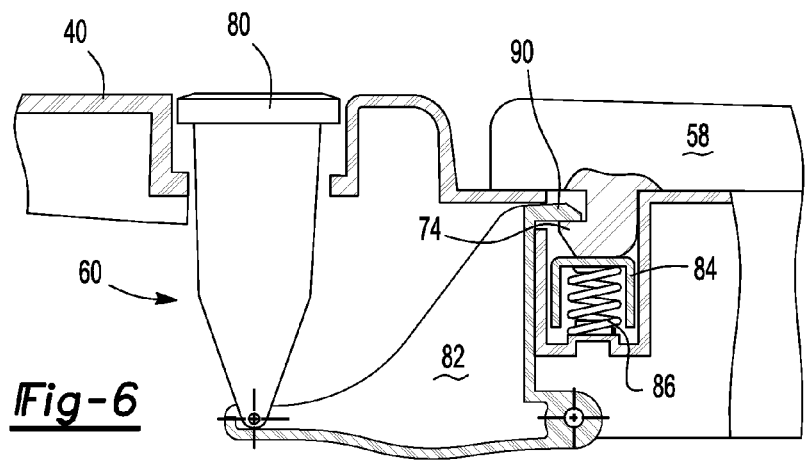
FIGS. 6-8 are fragmentary section views showing operation of a storage compartment lid latch mechanism.
Figure 7:
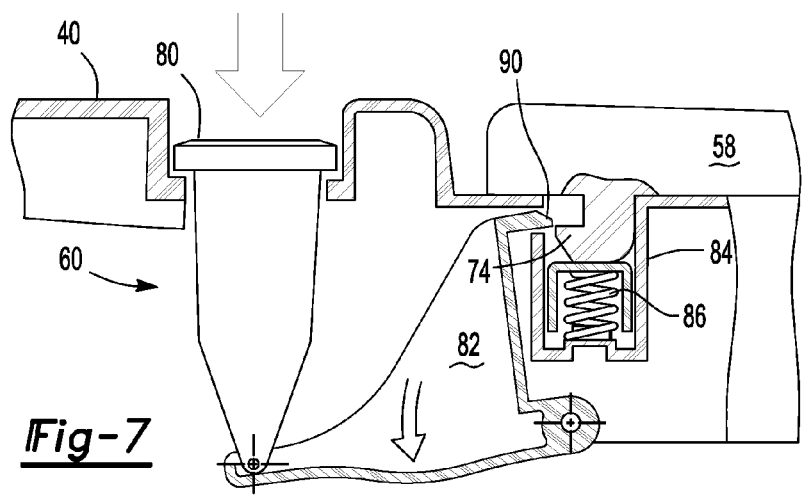
Figure 8:
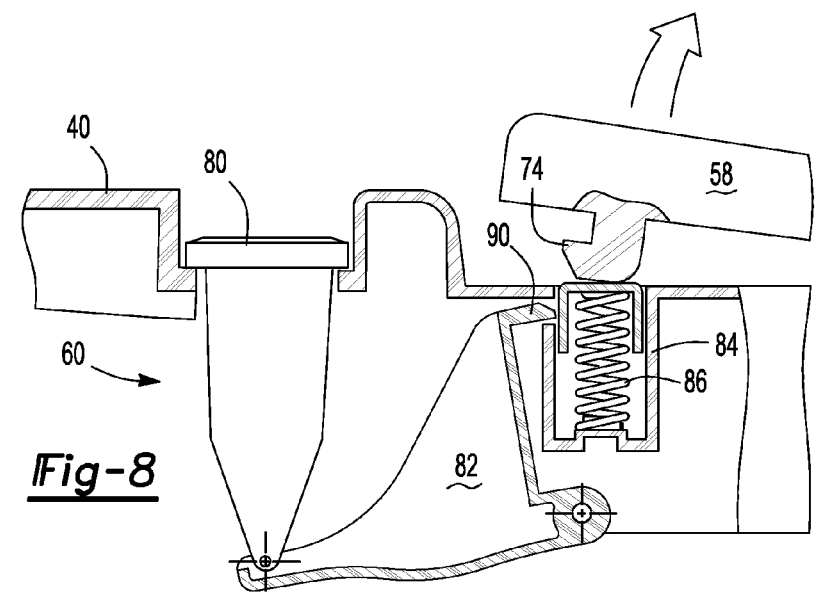

Referring to FIGS. 6-8, an exemplary storage compartment latch mechanism 60 is shown. The storage compartment latch mechanism 60 may be provided to latch and release the storage compartment lid 58. The storage compartment latch mechanism 60 may include a button 80, a latch member 82, a block 84, and a biasing member 86. The storage compartment latch mechanism 60 may also include a second biasing member that exerts force on the button 80 and/or the latch member 82 to bias the button 80 and/or latch member 82 toward the latched position shown in FIG. 6

The button 80 may be received in an opening in the body 40 and facilitate release of the storage compartment lid 58. The button 80 may have a first end that is disposed proximate an exterior surface of the body 40 and a second end disposed opposite the first end. The second end may be pivotally coupled to the latch member 82. The latch member 82 may be pivotally disposed on the body 40 and may have a latch arm 90 that is configured to engage the lid latch 74.

The block 84 may be disposed in another opening in the body 40. The biasing member 86, which may be a spring, may be disposed in the opening between the body 40 and the block 84. The biasing member 86 may bias the block 84 upward toward the storage compartment lid 58.

FIGS. 6-8 illustrate operation of the storage compartment latch mechanism 60. In FIG. 6, the storage compartment lid 58 is shown in the closed position. In the closed position, the latch arm 90 may engage the lid latch 74 to hold the storage compartment lid 58. In addition, the button 80 may be disposed near a surface of the body 40 and the biasing member 86 may be compressed by the block 84 and the lid latch 74.

In FIG. 7, the button 80 is actuated. Actuation of the button 80 rotates the latch member 82 such that the latch arm 90 disengages the lid latch 74. In response, the storage compartment lid 58 is free to move upward to the position shown in FIG. 8 in which the storage compartment lid 58 is moved away from the body 40 due to the biasing force exerted by the biasing member 86 on the block 84 which in turn exerts force on the lid latch 76 to partially open the storage compartment lid 58. The top surface of the block 84 may be disposed flush with a top surface of the body 40 to provide a desired aesthetic appearance. The storage compartment lid 58 may be opened further by manual actuation.

Figure 9:
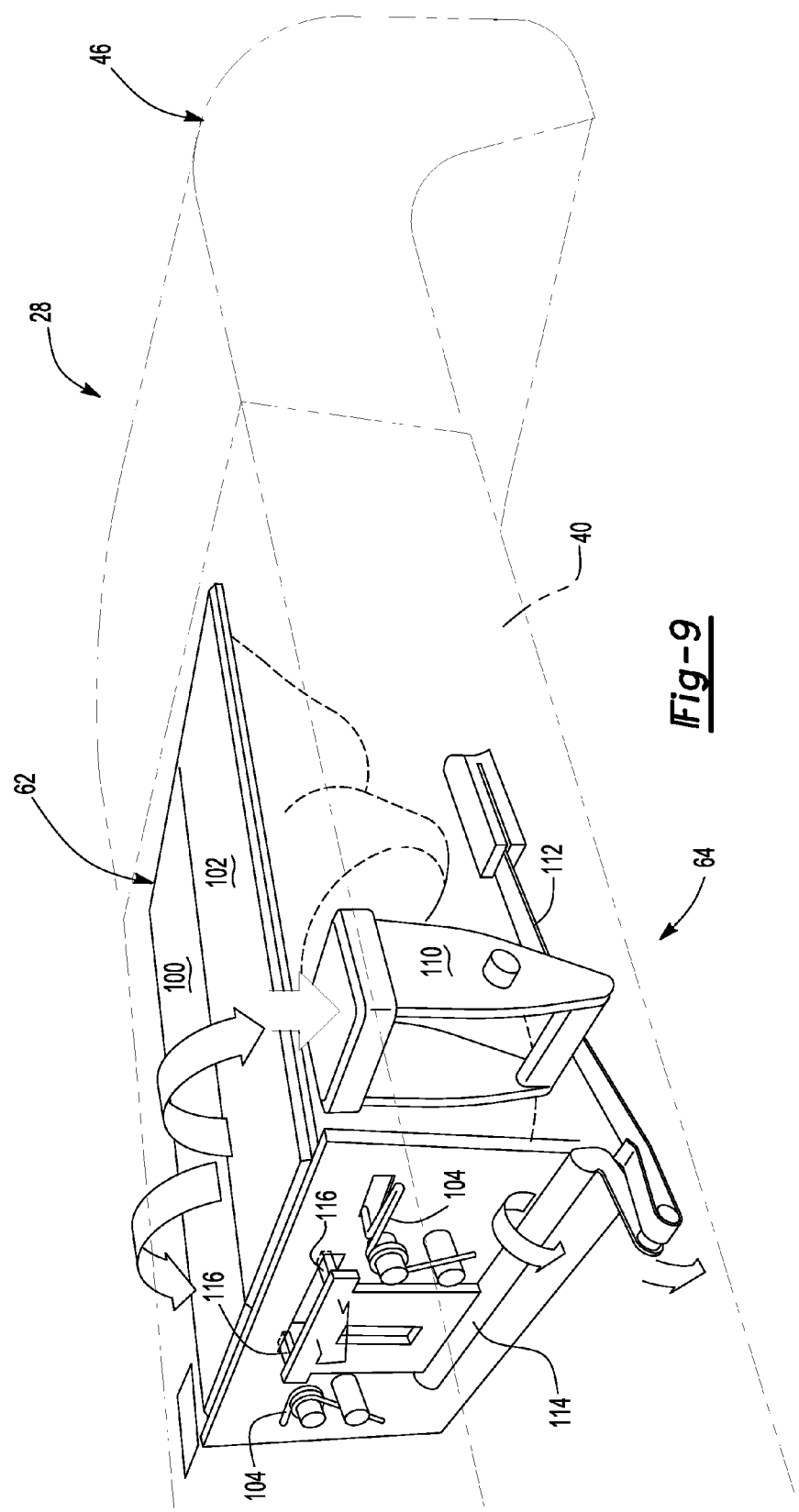
FIG. 9 is a fragmentary section view showing a cupholder release mechanism.

Referring to FIGS. 3, 5 and 9, the cupholder 62 may be provided on the body 40 to receive one or more beverage containers. The cupholder 62 may be disposed between the storage compartment 56 and the headrest 46 in one or more embodiments. The cupholder 62 may be configured to pivot between a closed position shown in FIG. 3 and an open position shown in FIG. 5. The cupholder 62 may include a first cupholder member 100, a second cupholder member 102, one or more cupholder springs 104, and one or more flaps 106.

The first and second cupholder members 100, 102 may be configured to pivot in opposite directions between the closed and open positions. Each cupholder member 100, 102 may include one or more recesses that cooperate to define one or more cupholder openings.

The cupholder springs 104 may be configured to bias the cupholder members 100, 102 to move from the closed position toward the open position. In the embodiment shown, two cupholder springs 104 are disposed on the body 40 for biasing the first and second cupholder members 100, 102, respectively.

A flap 106 may extend into each cupholder opening for engaging a beverage container. The flap 106 may be spring loaded and be biased toward the center of an associated cupholder opening to engage and help hold a beverage container.

Referring to FIG. 9, an embodiment of a cupholder release mechanism 64 is shown. The cupholder release mechanism 64 may be configured to permit and/or inhibit movement of the first and second cupholder members 100, 102. The cupholder release mechanism 64 may include a button 110, a latch biasing member 112, and a latch member 114.

The button 110 may be received in an opening in the body 40 and facilitate release of the cupholder members 100, 102. The button 110 may have a first end that is disposed proximate an exterior surface of the body 40 and a second end disposed opposite the first end. The second end may engage the latch biasing member 112.

The latch biasing member 112 may be disposed on the body 40 and may link the button 110 and the latch member 114. The latch biasing member 112 may be configured as a spring. In at least one embodiment, the latch biasing member 112 may have a first end disposed on the body 40 and a second end that engages the latch member 114. The latch biasing member 112 may bias the button 110 and the latch member 114 toward the positions shown in FIG. 9.

The latch member 114 may be configured to engage the cupholder members 100, 102 to inhibit opening of the cupholder and disengage the cupholder members 100, 102 to permit opening of the cupholder. The latch member 114 may have any suitable configuration. In at least one embodiment, the latch member 114 may include a first end that engages the latch biasing member 112 and a second end disposed proximate the body 40 that may have one or more engagement features 116. The engagement features 116 may extend into openings in the body 40 and toward the cupholder members 100, 102.

FIG. 9 helps illustrates operation of the cupholder 62 and cupholder release mechanism 64. In FIG. 9, the cupholder 62 is shown in the closed position. In the closed position, the engagement features 116 may engage the cupholder members 100, 102 to inhibit rotation. The latch biasing member 112 may inhibit disengagement of the engagement features 116 and bias the button 110 toward the position shown. Actuation of the button 110 in the direction indicated by the arrow flexes the latch biasing member 112, which moves the latch member 114 such that the engagement features 116 disengage the cupholder members 100, 102. The cupholder members 100, 102 are then free to move toward the open position under the biasing force of the cupholder springs 104.

Referring again to FIG. 5, an exemplary control panel 66 is shown. The control panel 66 may be provided on the body 40 to facilitate control and/or connection to electrical devices. In the embodiment shown, two control panels are provided on opposite sides of the cupholder 62. The control panel 66 may include one or more electrical connectors to facilitate connection to an electrical device, such as audio equipment like headphones or video equipment. The electrical connectors may facilitate input and/or output of an electrical signal and may include a USB port. The control panel 66 may include control devices, such as volume control, volume muting, and input or source select controls for selecting an audio and/or video source.

Referring to FIGS. 4 and 10, an exemplary support post 42 is shown. The support post 42 may be disposed on the armrest 28 and may be made of any suitable material or materials, such as a metal or metal alloy. The support post 42 may include a lower portion 120 and an upper portion 122.

The lower portion 120 may extend through the top of the armrest 28. In addition, the lower portion 120 may move with respect to the armrest 28 in one or more embodiments. For instance, the lower portion 120 may be disposed in a guide sleeve 124 that may be disposed on the frame of the armrest 28. The guide sleeve 124 may include a release button which may be actuated to permit movement of the lower portion 120 through the guide sleeve 124.

The upper portion 122 may or may not be coaxially disposed with the lower portion 120. In addition, the upper portion 122 may be integrally formed with the lower portion 120. In the embodiment shown, the upper portion 122 may be generally U-shaped and extends between two lower portions 120 of the support post 42. The upper portion 122 may be primarily disposed inside the headrest 46 and may include one or more rocker arms 126 and a sector gear 128 as is best shown in FIGS. 10-13.

The rocker arm 126 may be fixedly disposed on the support post 42. In the embodiment shown, two rocker arms 126 are provided that are spaced apart from each other and disposed in a generally parallel relationship. The rocker arm 126 may extend downwardly toward the body 40 of the armrest 28 and may include a slot 130.

The sector gear 128 may also be disposed on the support post 42 and may also extend downwardly toward the body 40 of the armrest 28. In the embodiment shown, the sector gear 128 is disposed between the rocker arms 126. The sector gear 128 may cooperate with a damper 132 disposed in the headrest 46 to dampen rotation of the headrest 46 about a second axis of rotation 134.

Referring to FIGS. 4 and 10-15, additional components of the armrest 28 will now be described in more detail beginning with the release rod 44. The release rod 44 may be disposed on the armrest 28 and may generally extend along the body 40 toward the headrest 46. The release rod 44 may extend though a top surface of the body 40 and may be configured to move in the same general direction as the support post 42. The release rod 44 may have any suitable configuration. In at least one embodiment, the release rod 44 may have a generally L-shaped configuration. The release rod 44 may include a first end 140 and a second end 142.

The first end 140 may be disposed outside the armrest 28 and may be configured to engage the headrest 46. The first end 140 may include a pin 144 that may facilitate engagement with the headrest 46 as will be described in more detail below. The pin 144 may extend at an angle from the first end 140. In at least one embodiment, the pin 144 may extend substantially perpendicular from the first end 140 and may extend away from the support post 42.

The second end 142 may be disposed opposite the first end 140. The second end 142 may generally be disposed in the armrest 28 and may be configured to engage the latch 26 to disengage the latch 26 from the locking feature 50 when the headrest 46 is pivoted as will be described in more detail below. Optionally, a biasing member, such as a spring, may be provided that exerts a biasing force on the release rod 44 to bias the second end 142 away from the latch 26.

The headrest 46 may be configured to support the head of an occupant of the seat assembly 10. In addition, the headrest 46 may be rotatably disposed on the support posts 42 and configured to rotate about a second axis of rotation 134 as will be described in more detail below. The headrest 46 may be generally be disposed proximate the first end of the body 40 and may include a trim cover 150, a cushion 152, a housing 154, a latching mechanism 156, and a biasing member 158.

The trim cover 150 may cover at least a portion of a visible exterior surface of the headrest 46 and may be engaged by a seat occupant. The trim cover 150 may be made of any suitable material or materials, such as a fabric, vinyl, leather, or the like. The trim cover 150 may cover the cushion 152, which may be disposed under at least a portion of the trim cover 150.

The housing 154 may be at least partially disposed under the trim cover 150 and/or cushion 152. The housing 154 may be made of any suitable material or materials, such as a polymeric material. The housing 154 may be pivotally disposed on the support post 42 and may at least partially receive the latching mechanism 156. The housing 154 may include one or more support post openings 160, a release rod opening 162, and a cam curve portion 164.

The support post opening 160 may be configured to receive a support post 42. As is best shown in FIG. 4, two support post openings 160 may be provided in a back panel of the housing 154. The support post openings 160 may be configured to permit rotation of the headrest 46. For instance, the support post openings 160 may be configured as elongated slots that generally extend in a direction from the back to the front of the headrest 46 to permit space for the headrest 46 to rotate without obstruction by the support post 42.

The release rod opening 162 may be provided in the housing 154 for receiving the release rod 44. The release rod opening 162 may be configured to permit the release rod 44 to pass through the housing 154 when the headrest 46 is in a predefined rotational position, such as when the headrest 46 is rotated toward the support post 42 to a first rotational position. The release rod opening 162 may have any suitable configuration that accommodates the first end 140 of the release rod 44 and the pin 144.

The cam curve portion 164 may be provided to engage the release rod 44. The cam curve portion 164 may be integrally formed with a portion of the housing 154, such as the back panel. The cam curve portion 164 may include a first curved surface 170 and a second curved surface 172 disposed adjacent to the first curved surface 170. The first and second curved surfaces 170, 172 may be configured to engage the pin 144 when the headrest 46 is rotated. The first and second curved surfaces 170, 172 may have different centers and/or radii of curvature so that the pin 144 may be retained on the second curved surface 172 to inhibit rotation of the headrest 46 when a sufficient actuation force is not applied.

The latching mechanism 156 may be configured to selectively permit or inhibit movement of the headrest 46 with respect to the support post 42. The latching mechanism 156 may include a latch plate 180, a latch spring 182, a release catch 184, and one or more buttons 186.

The latch plate 180 may be moveably disposed on the body 40. The latch plate 180 may move between a first position shown in FIG. 12 and a second position shown in FIG. 13. In the first position, the latch plate 180 may inhibit rotation of the headrest 46. For example, the latch plate 180 may engage the rocker arm 126 in a manner that inhibits headrest rotation. In at least one embodiment, the latch plate 180 may include one or more tabs 190 that may be disposed in a slot 130 in the rocker arm 126 when the latch plate 180 is in the first position. In the second position, the latch plate 180 may permit rotation of the headrest 46. For example, the latch plate 180 may disengage the rocker arm 126 to permit headrest rotation. In at least one embodiment, one or more tabs 190 may be spaced apart from a slot 130 in the rocker arm 126 when the latch plate 180 is in the second position. The latch plate 180 may include a hole 192.

The latch spring 182 may be configured to bias the latch plate 180 toward the first position. The latch spring 182 may have any suitable configuration. In at least one embodiment, the latch spring 182 may be disposed on a mounting pin on the housing 154 and may have at least one arm that extend toward and engages the latch plate 180 to exert a biasing force.

The release catch 184 may be pivotally disposed on the housing 154. The release catch 184 may engage the latch plate 180 to inhibit movement from the first position and disengage the latch plate 180 to permit movement toward the second position. The release catch 184 may have any suitable configuration. In at least one embodiment, the release catch 184 may be generally U-shaped and may have a first end 200 and a second end 202. The first end 200 may be configured to engage the release rod 44 and/or the pin 144. The second end 202 may be disposed opposite the first end 200 and may be configured to engage the latch plate 180. In at least one embodiment, the second end 202 may extend downwardly toward the latch plate 180 and may be disposed in the hole 192 in the latch plate 180 to hold the latch plate 180 in the first position.

One or more buttons 186 may be disposed on the headrest 46 to facilitate actuation of the latch plate 180. In the embodiment shown, two buttons 186 are provided; however, a button 186 could be deleted in one or more embodiments. The button 186 may be visible or concealed by the trim cover 150. Actuation of the button 186 may move the latch plate 180 from the first position toward the second position when the release catch 184 is disengaged from the latch plate 180. A button spring 206 may be provided to actuate or bias the button 186 outwardly or toward an exterior surface of the headrest 46.

The biasing member 158 may be provided to exert a biasing force that helps rotate the headrest 46. The biasing member 158 may have any suitable configuration. In at least one embodiment, the biasing member 158 may be a spring and may be disposed on or around the support post 42. The biasing member 158 may have one or more arms that engage the housing 154 and bias the headrest 46 to rotate about the second axis of rotation 134. For example, the biasing member 158 may bias the headrest 46 to rotate from a first rotational position shown in FIG. 10 or 11 toward a second rotational position shown in FIG. 15.

Referring to FIG. 16, the mounting bracket assembly 30 is shown in more detail. The mounting bracket assembly 30 may facilitate mounting of the armrest 28 to the seat back 18.

The mounting bracket assembly 30 may include a mounting bracket 210 and one or more guide sleeves 212.

The mounting bracket 210 may be fixedly mounted on the seat assembly 10, such as on the seat back 18. The mounting bracket 210 may be made of any suitable material, such as a metal or metal alloy. The mounting bracket 210 may have any suitable configuration. In the embodiment shown, the mounting bracket 210 is generally U-shaped and includes a pair of opposing lateral arms 220 that each includes a first opening 222, a locking member 224, and a second opening 226.

The first opening 222 may receive a pivot pin 52 of the armrest 28 to facilitate rotation of the armrest 28 about the first axis of rotation 32. The first opening 222 may have any suitable configuration and may be disposed in any suitable location. In the embodiment shown, the first opening 222 is configured as an open ended slot and is disposed along an edge of each lateral arm 220.

The locking member 224 may be configured to help hold the pivot pin 52 in the first opening 222. The locking member 224 may be disposed proximate the first opening 222 and may have any suitable configuration. For example, the locking member 224 may be configured as a spring that may be mounted to the mounting bracket 210. The locking member 224 may have an arm 228 that may flex to permit the pivot pin 52 to be inserted into the first opening 222 and return to an initial position to inhibit removal of the pivot pin 52 from the first opening 222. In addition, the arm 228 may have a curved end that receives and/or engages the pivot pin 52 and permits the pivot pin 52 to rotate about the first axis of rotation 32.

The second opening 226 may be provided to help guide and/or limit rotational movement of the armrest 28. The second opening 226 may be spaced apart from the first opening 222 and may have any suitable configuration. For example, the second opening 226 may be configured as a curved slot. The second opening 226 may receive the guide sleeve 212.

The guide sleeve 212 may cooperate with the second opening to help guide and limit rotational movement of the armrest 28. The guide sleeve 212 may extend into or through the second opening 226 and may have a guide sleeve opening 230. The guide sleeve opening 230 may have a similar configuration as the second opening 226 and may receive the stop pin 54. The guide sleeve 212 may be made of any suitable material, such as a polymeric material. As such, the guide sleeve 212 may dampen pivotal movement of the armrest 28 due to friction between the guide sleeve 212 and the pivot pin 52. The guide sleeve opening 230 may include a first end 232 and a second end 234 disposed opposite the first end 232. The pivot pin 52 may engage or be disposed proximate to the first end 232 when the armrest 28 is in the folded position and may engage or be disposed proximate to the second end 234 when the armrest 28 is in the unfolded position. The second end 234 may be enlarged with respect to an adjacent portion of the guide sleeve opening 230 to reduce the friction between the pivot pin 52 and the guide sleeve 212 to provide a firm tactile response or feel to a user to indicate that the armrest 28 has been fully unfolded.

Referring to FIGS. 10-15, movement of the armrest 28 will be described in greater detail. These figures do not show the armrest 28 in every possible position and omit various components for clarity.

Referring to FIG. 10, the armrest 28 is shown in the folded position in which the latch 26 engages the locking feature 50 on the armrest 28 to inhibit rotation of the armrest 28 about the first axis of rotation 32. The headrest 46 is also disposed in a first rotational position and is shown in an extended position in which the headrest 46 is moved away from a top surface of the armrest 28. Movement of the headrest 46 to the extended position may be accomplished by moving the support posts 42 through the armrest 28.

Referring to FIG. 11, the headrest 46 is moved from the extended position to a retracted position by moving the headrest 46 toward the armrest 28. During movement from the extended position to the retracted position, the pin 144 on the release rod 44 moves through the release rod opening 162. The pin 144 may then engage the first end 200 of the release catch 184 and rotate the release catch 184 about a third axis of rotation 240 in a counterclockwise direction from the perspective shown. Rotation of the release catch 184 disengages the second end 202 from the hole 192 in the latch plate 180. As such, the latch plate 180 is free to move in response to a sufficient actuation force.

Figure 12:
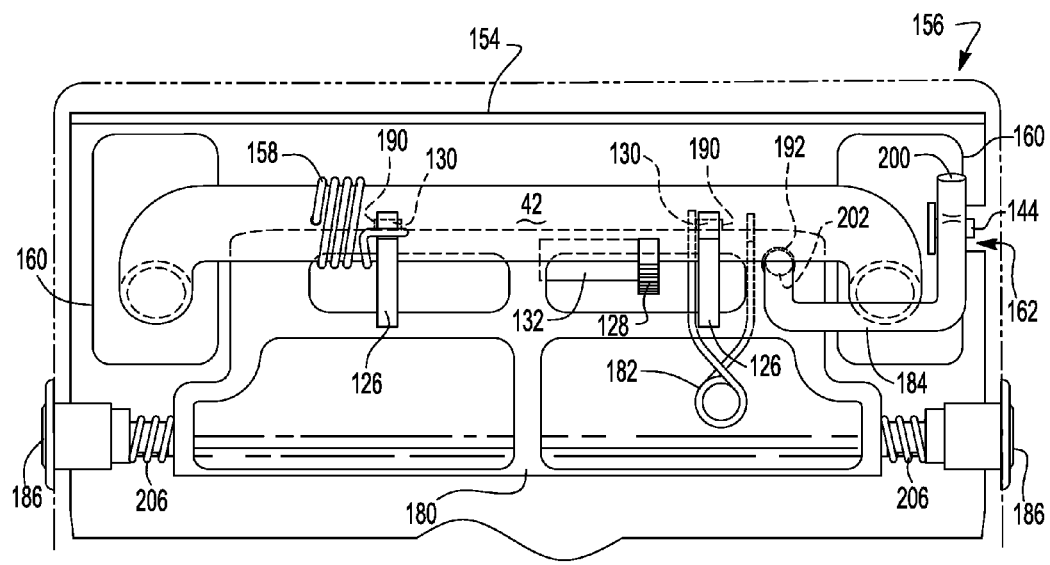
FIG. 12 is a top view of the headrest in FIG. 11 showing a latch plate in a first position.

Referring to FIG. 12, the armrest 28 is shown in the same position as FIG. 11, but from above the headrest 46. The latch plate 180 is shown in a first position in which the tabs 190 of the latch plate 180 are disposed in slots 130 in the rocker arms 126 to inhibit rotational movement of the headrest 46.

Figure 13:
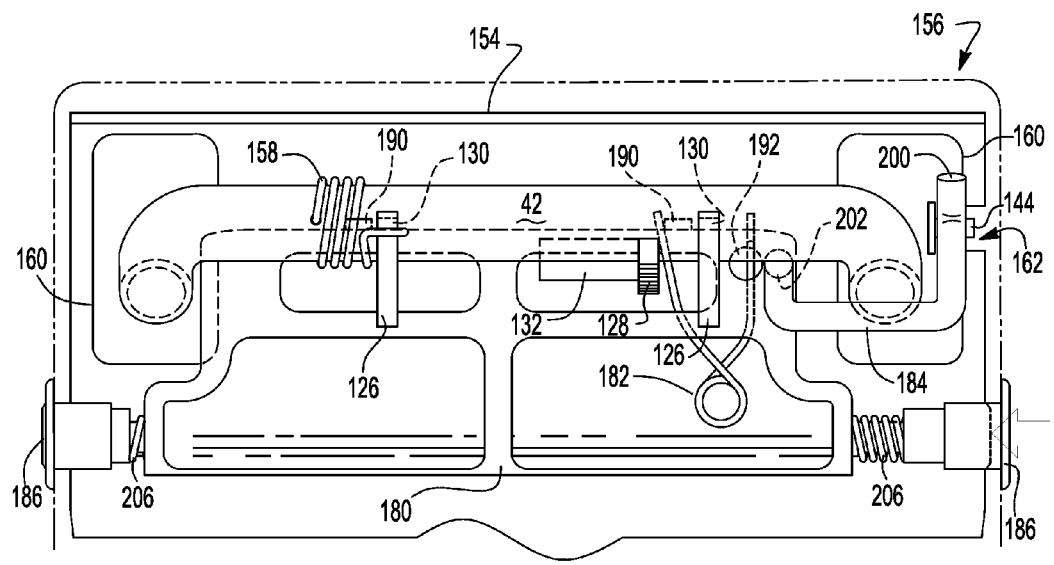
FIG. 13 is a top view of the headrest showing the latch plate in a second position.

Referring to FIG. 13, the button 186 has been actuated to move the latch plate 180 from the first position to the second position, which is to the left from the perspective shown. In the second position, the tabs 190 of the latch plate 180 are disengaged from the slots 130 in the rocker arms 126, thereby permitting rotational movement of the headrest 46 about the second axis of rotation 134.

Referring to FIG. 14, the headrest 46 is rotated about the second axis of rotation 134 toward the second rotational position. Rotation of the headrest 46 toward the second rotational position engages the pin 144 with the first curved surface 170 of the cam curve portion 164. As the headrest 46 rotates, the pin 144 moves along the first curved surface 170 toward the second curved surface 172 and pulls the release rod 44 toward the headrest 46. As a result, the second end 142 of the release rod 44 may engage the latch 26.

Referring to FIG. 15, the headrest 46 is rotated about the second axis of rotation 134 to the second rotational position. In the second rotational position, the release rod 44 is moved further toward the headrest 46 and the pin 144 engages the second curved surface 172 of the cam curve portion 164 and further rotation of the headrest 46 in a counterclockwise direction is inhibited. In addition, the second end 142 of the release rod 44 forces the latch 26 out of engagement with the locking feature 50 on the armrest 28. As a result, the armrest 28 is free to move from the folded position toward the unfolded position shown in FIG. 3.

The sequence of steps shown in FIGS. 10-15 may be generally reversed to move the armrest 28 from the unfolded position shown in FIG. 3 to the folded positions shown in FIG. 3 or 10. Actuation of the button 186 may be omitted as the latch spring 182 may bias the latch plate 180 from the second position toward the first position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising: a seat back;
an armrest disposed on the seat back and configured to pivot about an axis of rotation, the armrest having a headrest that is moveable with respect to the armrest between an extended position and a retracted position; and
a support post moveably disposed on the seat back and received by the headrest, wherein the support post includes a rocker arm and the headrest further comprises a latch plate that moves between a first position and a second position, wherein the rocker arm engages the latch plate to inhibit rotation of the headrest and the rocker arm disengages the latch plate to permit rotation of the headrest, and
the armrest is inhibited from pivoting about the axis of rotation when the headrest is in the extended position.

2. The seat assembly of claim 1 wherein the rocker arm further comprises a slot and the latch plate further comprises a tab that extends toward the support post, wherein the rotation of the headrest is inhibited when the tab is disposed in the slot and rotation of the headrest is permitted when the tab is spaced apart from the slot.

3. The seat assembly of claim 1 wherein the headrest further comprises a biasing member that biases the latch plate toward the first position.

4. The seat assembly of claim 1 wherein the headrest further comprises a button that actuates the latch plate toward the second position.

5. The seat assembly of claim 1 wherein the headrest further comprises a mounting plate and a release catch pivotally disposed on the mounting plate, wherein the latch plate is inhibited from moving from the first position to the second position when the release catch engages the latch plate and the latch plate is permitted to move between the first and second positions when the release catch is disengaged from the latch plate.

6. The seat assembly of claim 5 wherein the release catch disengages the latch plate when the headrest is in the retracted position.

7. The seat assembly of claim 5 wherein the release catch is disposed in a hole in the latch plate to inhibit movement of the latch plate between the first and second positions.

8. The seat assembly of claim 5 wherein the seat back further comprises a release rod having a first end and a second end disposed opposite the first end, wherein the release rod engages the release catch to move the release catch away from the latch plate when the headrest is in the retracted position.

9. The seat assembly of claim 8 wherein the seat back further comprises a locking hook and the armrest further comprises a locking feature, wherein the second end of the release rod engages the locking hook and disengages the locking hook from the locking feature when the headrest is pivoted about the axis of rotation from a first rotational position in which the headrest is disposed proximate a front surface of the seat back toward a second rotational position in which the headrest is spaced apart from the front surface of the armrest.

10. A seat assembly comprising:
a seat back; and
an armrest configured to pivot with respect to the seat back about a first axis of rotation, the armrest having a headrest that is configured to pivot about a second axis of rotation between a first rotational position in which the headrest engages the seat back and a second rotational position in which the headrest is spaced apart from the seat back;
wherein the armrest is permitted to pivot about the first axis of rotation when the headrest is in the second rotational position.

11. The seat assembly of claim 10 wherein the headrest further comprises a mounting plate having a cam curve portion and the seat back further comprises a release rod that extends through a top surface of the seat back, wherein the release rod engages the cam curve portion when the headrest is rotated.

12. The seat assembly of claim 11 wherein the cam curve portion includes a first curved surface and a second curved surface disposed adjacent to the first curved surface, and wherein the release rod includes a pin that engages the second curved surface when the headrest is in the second rotational position.

13. The seat assembly of claim 12 wherein the release rod moves upwardly through the top surface of the seat back when the pin moves along the cam curve portion.

14. The seat assembly of claim 12 wherein the headrest further comprises a release catch pivotally disposed on the mounting plate and a latch plate, wherein the latch plate is permitted to move between a first position and a second position when the pin rotates the release catch to disengage the latch plate.

15. A seat assembly comprising:
a seat back; and
an armrest disposed on the seat back and configured to pivot about a first axis of rotation between a folded position and an unfolded position, the armrest having a top surface, a front surface, and a headrest that is moveable between an extended position in which the headrest is spaced apart from the top surface and a retracted position in which the headrest engages the top surface;
wherein the armrest is permitted to pivot about the first axis of rotation between the folded and unfolded positions when the headrest is in the retracted position and the headrest is rotated about a second axis of rotation from a first rotational position in which the headrest engages the front surface to a second rotational position in which the headrest is spaced apart from the front surface.

16. The seat assembly of claim 15 further comprising a support post extending from the seat back and having a sector gear, wherein the headrest is pivotally disposed on the support post and includes a damper that cooperates with the sector gear to dampen rotation of the headrest about the second axis of rotation.

17. The seat assembly of claim 15 wherein the armrest further comprises a first pin and a second pin; and
wherein the seat back further comprises a mounting bracket having a first opening, a locking member, a second opening, and a guide sleeve;
wherein the first opening and locking member engage the first pin to permit the armrest to rotate about the first axis of rotation and the second opening and guide sleeve receive the second pin to constrain movement of the armrest between the first and second rotational positions.

18. The seat assembly of claim 15 wherein the armrest further comprises a cupholder and a storage bin.

* * * * *